(12) United States Patent
Putnam

(10) Patent No.: US 6,467,793 B2
(45) Date of Patent: Oct. 22, 2002

(54) GOOSENECK COUPLER

(76) Inventor: Rex D. Putnam, 10201 Moser Dr., Bronson, MI (US) 49028

( * ) Notice: Subject to any disclaimer, the term of this patent is extended or adjusted under 35 U.S.C. 154(b) by 0 days.

(21) Appl. No.: 09/780,915

(22) Filed: Feb. 9, 2001

(65) Prior Publication Data

US 2002/0109335 A1 Aug. 15, 2002

(51) Int. Cl.⁷ .................................................. B60D 1/01
(52) U.S. Cl. ...................... 280/508; 280/512; 280/436; 280/901
(58) Field of Search ................................. 280/508, 509, 280/510, 511, 512, 433, 434, 435, 436, 901

(56) References Cited

U.S. PATENT DOCUMENTS

| | | | |
|---|---|---|---|
| 1,240,818 A | | 9/1917 | Buller |
| 2,481,481 A | | 9/1949 | Wolfrum |
| 2,676,034 A | | 4/1954 | Tracey |
| 2,772,895 A | * | 12/1956 | Steeves et al. .............. 280/432 |
| 3,352,571 A | * | 11/1967 | Nelson ........................ 280/435 |
| 3,589,754 A | * | 6/1971 | Randolph et al. ............. 403/13 |
| 3,796,443 A | * | 3/1974 | Crutchfield .............. 280/406.2 |
| 3,796,444 A | * | 3/1974 | Hixon ....................... 280/423.1 |
| 3,811,706 A | | 5/1974 | Tucker et al. |
| 4,127,856 A | | 11/1978 | Bickel |
| 4,227,713 A | | 10/1980 | Blodgett, Jr. |
| 4,258,930 A | | 3/1981 | Hess |
| 4,545,596 A | | 10/1985 | Luke et al. |
| 4,962,945 A | | 10/1990 | Vannoy et al. |
| 5,183,284 A | | 2/1993 | Paplinski |
| 5,205,666 A | | 4/1993 | Hollis |

* cited by examiner

Primary Examiner—Kevin Hurley
(74) Attorney, Agent, or Firm—Mary M. Moyne; Ian C. McLeod

(57) ABSTRACT

A coupling device (10) for allowing a user to connect a trailer (104) having a gooseneck assembly to a hitch ball (102) of a towing vehicle (106). The coupling device includes a housing (12), jaws (24 and 26) and a locking mechanism (32). The jaws are pivotably mounted in the housing and are biased into the open position by springs (30). The locking mechanism includes a locking slide bar (38) which moves across the front of the jaws when the jaws are in the closed position. When the jaws are in the open position and the locking slide bar is unlocked, the jaws prevent the locking slide bar from moving to the closed position. When the hitch ball is moved between the jaws, the jaws move to the closed position and, the unlocked, locking slide bar automatically moves to the closed position.

48 Claims, 7 Drawing Sheets

GOOSENECK COUPLER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION (1) Field of the Invention

The present invention relates to a gooseneck coupler which connects with a hitch ball for towing a gooseneck trailer. The coupler has jaws which pivot automatically into a closed position when the hitch ball is moved into the coupler. In particular, the present invention relates to a gooseneck coupler attached to a gooseneck trailer having jaws which automatically move into the closed position and a locking slide bar which automatically moves to a locked, closed position when the hitch ball located in the bed of the towing vehicle is moved into the coupler.

(2) Description of the Related Art

The related art has shown various hitch coupling devices having jaws which close automatically around the hitch ball or pin where a locking mechanism is provided to lock the jaws in the closed position. Illustrative are U.S. Pat. Nos. 1,240,818 to Buller; U.S. Pat. No. 2,481,481 to Wolfrum; U.S. Pat. No. 2,676,034 to Tracev; U.S. Pat. No. 3,811,706 to Tucker et al; U.S. Pat. No. 4,127,856 to Bickel; U.S. Pat. No. 4,227,713 to Blodgett, Jr. et al; U.S. Pat. No. 4,545,596 to Luke et al; U.S. Pat. No. 4,962,945 to Vannoy et al; U.S. Pat. No. 5,183,284 to Paplinksi; and U.S. Pat. No. 5,205,666 to Hollis.

In particular, Buller, Tracey, Luke et al, Vannov et al and PaTlinski show hitch coupling devices having jaws which automatically pivot into a closed position as the hitch ball or pin is moved between the jaws. The jaws are locked in the closed position by a locking bar or block which is inserted between the back end of the jaws which prevents the jaws from pivoting into the open position. This type of locking mechanism is different from the locking mechanism of the present invention. In addition, the above devices do not provide a means for unlocking the locking mechanism from a distance such that a user can unlock the locking mechanism without climbing into the bed of the pickup truck.

Wolfrum, Bickel and Blodgett, Jr. et al show hitch coupling devices having jaws which close automatically. The locking mechanism of the coupling devices also locks automatically upon closing of the jaws. However, the jaws and locking mechanism are not similar to those, of the present invention. In addition, the above devices do not provide a means for unlocking the locking mechanism from a distance such that a user can unlock the locking mechanism without climbing into the bed of the pickup truck.

Also of interest is U.S. Pat. No. 4,227,713 to Blodaett. Jr. et al which describes a trailer hitch latching assembly having a locking pawl which automatically moves to the locked position when the trailer hitch member is moved into the cavity of the latch plate. The latching assembly includes a housing with a latch plate pivotably mounted within the housing. A locking pawl (bar) is also secured to the housing. The pawl is mounted such that in the retracted position a small portion of the forward edge abuts against the latch plate. In this position, the locking pawl is held in the retracted position and prevented from moving to the extended position. A spring is connected between the latching plate and the locking pawl and tends to bias the locking pawl into the extended position. When the latching plate is pivoted into a closed position by the hitch member, the locking pawl automatically moves into the closed, locked position. In this invention, the hitch member is directly adjacent the locking pawl. The jaws do not extend around the front of the hitch member. As with the other above device, the above locking assembly does not provide a means for unlocking the locking pawl from a distance such as to allow a user to unlock the assembly without climbing into the bed of the towing vehicle.

Only of minimal interest is U.S. Pat. No. 4,258,930 to Hess which shows an automatic hitch having a safety lock.

There remains the need for a coupling device which has all the benefits of the previous devices including jaws which automatically pivot into the closed position and also has a locking mechanism which automatically moves to a locked, closed position to prevent the jaws from opening and which also blocks the opening in the coupling device to prevent the hitch ball from moving out of the coupling device. Further, the device allows the locking mechanism to be unlocked from a distance such that a user can unlock the device without having to climb into the bed of the towing vehicle, particularly a pickup truck.

SUMMARY OF THE INVENTION

The coupling device of the present invention allows a single user to easily connect a gooseneck trailer, which utilizes the present invention, to a towing vehicle equipped with a gooseneck hitch ball installed preferably in the bed of a pickup truck. The coupling device allows for automatic locking of the device as soon as the device is correctly positioned on the hitch ball. The coupling device includes a housing, pivoting jaws and a locking mechanism. The housing allows for connection of the coupling device to a tubular gooseneck assembly. The top and bottom plates of the housing are designed to guide and accommodate the hitch ball. The housing also includes a guide plate to position and guide the hitch ball between the jaws as the hitch ball is moved into the coupling device. The jaws are pivotably mounted in the housing and are biased into the open position by torsion springs. The locking mechanism includes a locking slide bar which moves across the front of the jaws when the jaws are in the closed position. A spring of the locking mechanism tends to bias the locking slide bar to the closed position to allow for automatic closing of the locking slide bar. A locking lever allows the locking slide bar to be locked in the closed position or the open position. When the jaws are in the open position and the locking slide bar is unlocked, the jaws are in the path of the locking slide bar and the force of the spring tending to bias the jaws in the open position is greater than the force tending to move the locking slide bar into the closed position. Thus, the jaws prevent the locking slide bar from moving to the closed position. The jaws are moved to the closed position by contact of the hitch ball with the inner surface of the jaws. When the locking slide bar is in the unlocked, open position the locking slide bar automatically moves toward the closed position and when the hitch ball is moved between the jaws and the jaws move to the closed position. When the gooseneck trailer is securely coupled around the hitch ball located preferably in the bed of a pickup truck using the coupling device, the jaws of the coupling device are easily unlocked from their secured position by turning the handle of the locking mechanism in a counterclockwise direction which frees the locking lever from the second groove in the handle. Once the locking lever is cleared from the second groove, the handle can be freely moved toward a side of the vehicle away from the jaws by a user standing on the ground surface adjacent to the side of the vehicle. The handle is moved until the locking lever springs back into the first groove (FIG. 1) which secures the slide bar in an open position thereby permitting the jaws to open freely as the user moves the towing vehicle away from the trailer and thus, pulls the hitch ball free from the coupling device.

The present invention relates to a coupling device for mounting on a gooseneck of a towed trailer for coupling the towed trailer to a hitch ball mounted on a towing vehicle, which comprises: a plate having a first end and a second end with a first surface and a second surface extending therebetween with the second surface mounted on the gooseneck; a pair of jaws each having a first end and a second end and pivotally mounted between the ends adjacent the first surface of the plate such that the first end of the jaws is adjacent the first end of the plate and a space is provided between the jaws wherein in an open position, the first ends of the jaws are spaced apart and wherein when the hitch ball is moved between the spaced apart, first ends of the jaws into the space between the jaws, the hitch ball contacts the jaws at the second end of the jaws and pivots the jaws into a closed position such that the first ends of the jaws move towards each other; a stop mounted adjacent the second end of the jaws such that when the jaws are in the closed position and the second ends of the jaws are spaced apart, the stop extends between the spaced apart second ends of the jaws; and a locking slide bar mounted adjacent the first ends of the jaws such that in a closed position with the jaws in the closed position, the locking slide bar extends adjacent the first ends of the jaws and prevents the jaws from pivoting into the open position.

Further, the present invention relates to a coupling device for mounting on a towed gooseneck trailer for coupling the towed trailer to a hitch ball of a towing vehicle: a housing having an open first end and configured to be mounted on the towed gooseneck trailer; a pair of jaws pivotally mounted on the housing such that when the hitch ball is moved into the open first end of the housing, the hitch ball contacts the jaws and pivots the jaws between an open position and a closed position wherein when in the open position, the jaws do not block the open first end of the housing and wherein in the closed position, the jaws block the open first end of the housing; and a locking slide bar slidably mounted on the housing adjacent the open first end and configured to slide to a closed position across the open first end of the housing to block the open first end of the housing, wherein when the locking slide bar is in the closed position, the jaws are in the closed position and wherein in the closed position, the locking slide bar and the pair of jaws prevent the hitch ball from moving out of the open first end of the housing.

The invention relates to a coupling device for attachment of a gooseneck trailer to a towing vehicle having a hitch ball wherein the towing vehicle is a pickup truck and the hitch ball is in the bed of the pickup truck. The coupling device, when fully engaged in a locked position around the hitch ball located in the bed of a pickup truck, can be unlocked (unlatched) without entering the bed of the pickup truck. When the coupling device is unlocked or unlatched, the jaws of the coupling device open automatically which allows the towing vehicle to be driven free of the coupling device and the gooseneck trailer.

Still further, the present invention relates to a gooseneck attachment for use on a towed trailer for providing a connection with a hitch ball mounted in a bed of a towing vehicle which comprises: a tube having first and second ends with the first end connected to the towed trailer; a coupling device mounted at the second end of the tube for connecting to the hitch ball, the coupling device having: (i) a housing mounted on the second end of the tube and having an opening into which the hitch ball is moved; (ii) a pair of jaws pivotally mounted inside the housing so as to open to the opening and close at the opening, wherein when the jaws are in an open position and the hitch ball is moved horizontally into the housing through the opening, the hitch ball engages the jaws and pivots the jaws into a closed position and wherein the jaws are opened by moving the hitch ball toward the opening which releases the hitch ball; and (iii) a locking slide bar mounted on the housing so as to slide across the opening in the housing and block the pivoting of the jaws so that when the towing vehicle and towed trailer are connected with the hitch ball between the jaws and the jaws in the closed position, the hitch ball does not move out of the opening in the housing.

Further still, the present invention relates to a method for coupling a gooseneck trailer to be towed to a hitch ball in a bed of a towing vehicle, which comprises the steps of: providing a coupling device mounted on a tube extending from the gooseneck trailer, the coupling device including a housing having an open, first end and configured to be mounted on the tube of the gooseneck trailer; a pair of jaws pivotally mounted on the housing such that when the hitch ball is moved into the open, first end of the housing, the hitch ball contacts the jaws and pivots the jaws between an open position and a closed position, wherein when in the open position, the jaws do not block the open first end of the housing and when in the closed position, the jaws extend around the hitch ball adjacent the open first end and block the open first end of the housing; and a locking slide bar slidably mounted on the housing adjacent the open, first end and configured to slide to a closed position across the open first end of the housing to block the open first end of the housing; and moving the hitch ball essentially horizontally into the open, first end of the housing of the coupling device with the jaws in the open position wherein as the hitch ball contacts the jaws, the jaws pivot to the closed position and the locking slide bar moves to the closed position such that the locking slide bar prevents the hitch ball from moving out of the housing when the towed gooseneck trailer is being towed.

The invention relates to a coupling device for attachment of a gooseneck trailer to a towing vehicle having a hitch ball wherein the towing vehicle is a pickup truck and the hitch ball is in the bed of the pickup truck. The coupling device, when fully engaged in a locked position around the hitch ball located in the bed of a pickup truck, can be unlocked (unlatched) without entering the bed of the pickup truck. When the coupling device is unlocked or unlatched, the jaws of the coupling device open automatically which allows the towing vehicle to be driven free of the coupling device and the gooseneck trailer.

The substance and advantages of the present invention will become increasingly apparent by reference to the following drawings and the description.

DESCRIPTION OF THE PREFERRED EMBODIMENTS

Figure 3:
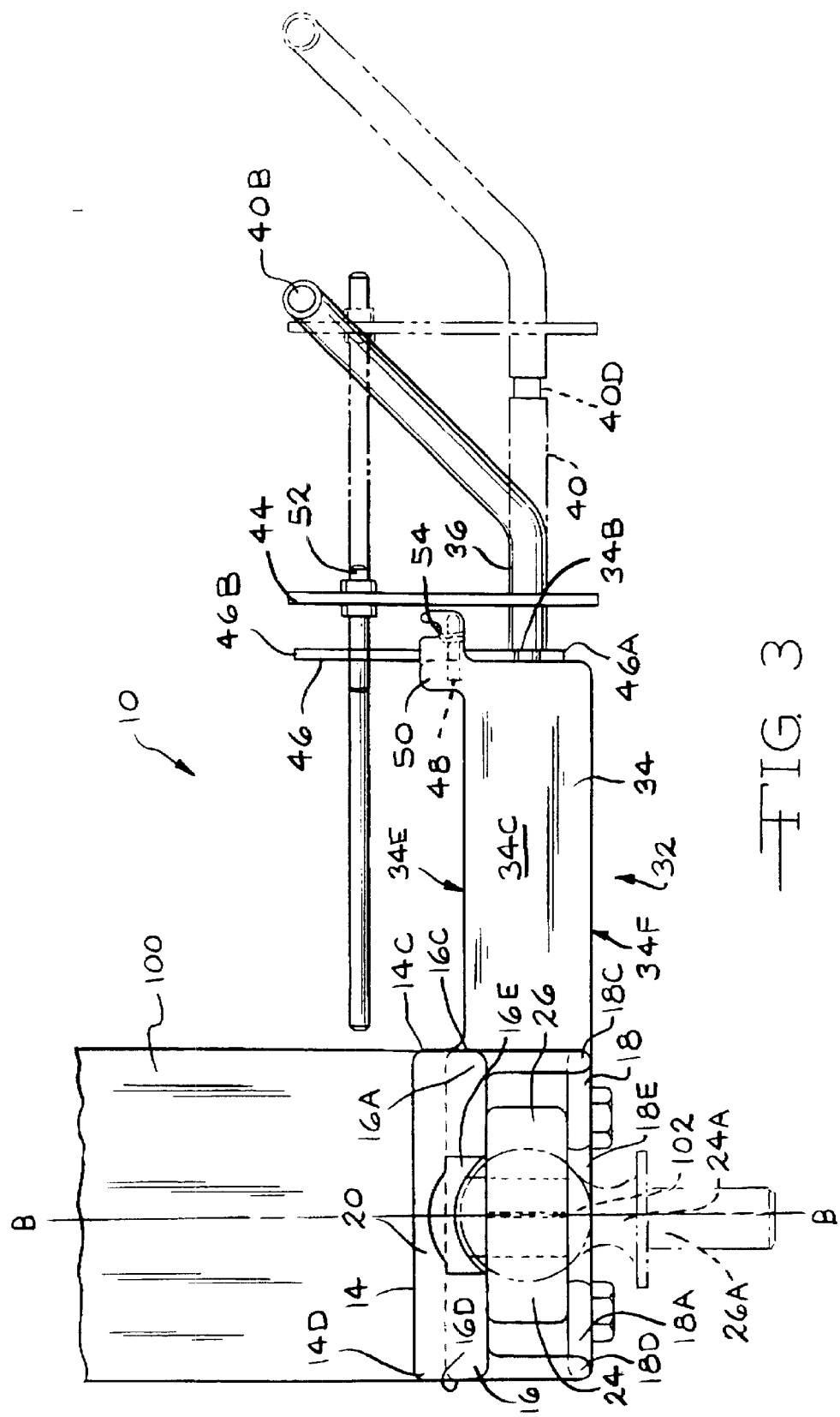
FIG. 3 is a front view of the coupling device 10 with the hitch ball 102 between the closed jaws 24 and 26 and the locking slide bar 38 in the locked, closed position with the handle 40 of the locking slide bar 38 shown in the unlocked position in phantom.
Figure 8:
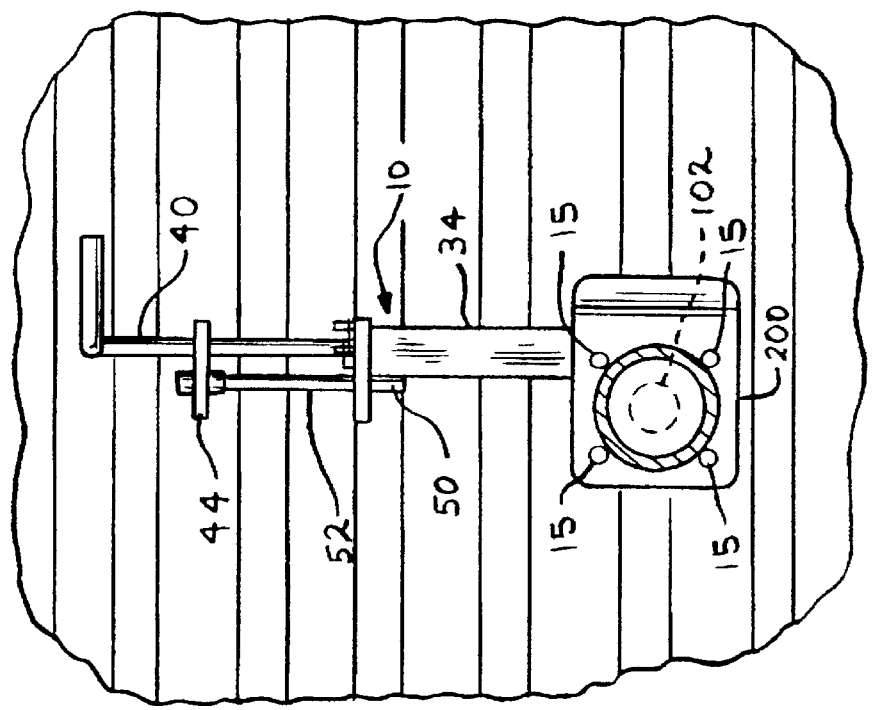
FIG. 8 is a partial top view of the coupling device 10 mounted on the tube of the gooseneck assembly 200 of an alternate embodiment having a round cross-section and showing the locating lugs 15.
Figure 7:
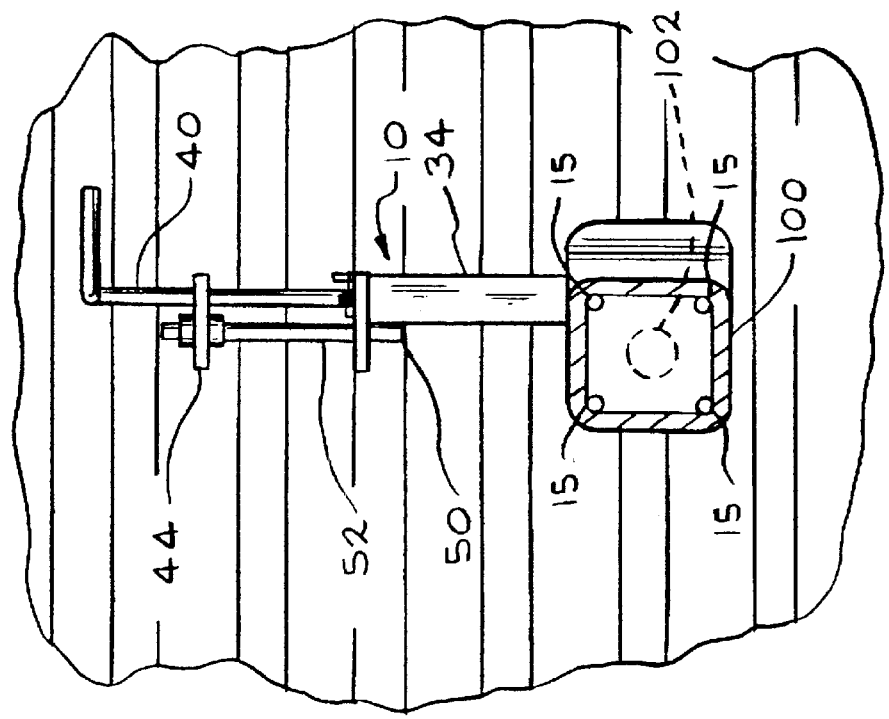
FIG. 7 is a partial top view of the coupling device 10 mounted on the tube 100 of the gooseneck assembly having a square cross-section and showing the locating lugs 15.

The coupling device or gooseneck coupler 10 of the present invention is intended to be mounted on the tubular end 100 or 200 of a gooseneck assembly of a vehicle 106 to be towed such as a trailer 104. The coupling device 10 preferably connects the tubular end 100 or 200 of the gooseneck assembly of the towed trailer 104 to a hitch ball 102 mounted on a towing vehicle 106. In the preferred embodiment, the hitch ball 102 is mounted in the bed 106A of a pickup truck 106. The coupling device 10 includes a housing 12, a pair of jaws 24 and 26 and a locking mechanism 32. The housing 12 has an attachment plate 14, a top plate 16, a bottom plate 18 and a side section 34 for the locking mechanism 32. The attachment plate 14, top plate 16, bottom plate 18 and side section 34 are preferably cast as an integral unit. The plates 14, 16 and 18 preferably have an essentially square shape with a front end 14A, 16A and 18A, a back end 14B, 16B and 18B, a first side 14C, 16C and 18C and a second side 14D, 16D and 18D. The tubular end 100 or 200 of the gooseneck assembly is mounted on the top surface of the attachment plate 14. In the preferred embodiment, the attachment plate 14 has a shape and size which allows for connecting the coupling device 10 to a gooseneck assembly having a tubular end 100 or 200 with either a round or square cross-section. The attachment plate 14 preferably has locating lugs 15 positioned to allow for the proper locating of the attachment plate 14 on the tubular end 100 or 200 of the gooseneck assembly. In the preferred embodiment, the locating lugs 15 position the tubular end 100 or 200 of the gooseneck assembly on the housing 12 of the coupling device 10 such that when the coupling device 10 fully engages the hitch ball 102, the tubular end 100 or 200 is symmetrical around a vertical axis B—B through the center of the hitch ball 102 (FIG. 3). In one embodiment, the tubular end 100 has a square cross-section with a hollow center (FIG. 7). The locating lugs 15 preferably extend into the hollow center of the tubular end 100 adjacent the sidewall of the tubular end 100. In another embodiment, the tubular end 200 has a circular cross-section with a sidewall having an outer surface (FIG. 8). The locating lugs 15 preferably extend adjacent the outer surface of the sidewall.

In the preferred embodiment, the coupling device 10 is configured to be mounted on a gooseneck assembly having a tubular end 100 or 200 with a 4×4 inch (10×10 cm) square cross-section or a 4 inch (10 cm) diameter round cross-section and having a sidewall of 0.25 inch (0.64 cm). The attachment plate 14 has a guide plate 20 along the front end 14A. The guide plate 20 extends upward and outward from the attachment plate 14 in a direction away from the bottom plate 16. In the preferred embodiment, the guide plate 20 and the attachment plate 14 are a single integral piece. In the preferred embodiment, the top plate 16 is mounted on the bottom surface of the attachment plate 14 on the side opposite the gooseneck assembly. The top plate 16 extends parallel to the attachment plate 14. The top plate 16 and attachment plate 14 can be a unitary piece. The top plate 16 preferably has a square shape with a size essentially equal to the size of the attachment plate 14 without the guide plate 20. The top plate 16 has a U-shaped notch 16E having an opening in the front end 16A of the top plate 16. The notch 16E helps to guide the hitch ball 102 toward the center of the housing 12 between the jaws 24 and 26. The bottom plate 16 preferably has a size essentially similar to the top plate 16. The bottom plate 18 has a notch 18E with an opening for the notch 18E in the front end 18A of the bottom plate 18. The notch 18E is preferably essentially V-shaped having angled sides and a rounded, closed end. The open end of the notch 18E has a width greater than the width of the closed end of the notch 18E. The top and bottom plates 16 and 18 are preferably mounted together in a spaced apart, parallel relationship by a hitch ball stop 22. The hitch ball stop 22 is preferably positioned at the closed, second end of the notches 16E and 18E. The hitch ball stop 22 preferably has a concave front surface such as to accommodate the hitch ball 102. The housing 12 is preferably provided with a front side between the front ends 16A and 18A of the top and bottom plates 16 and 18 and extends perpendicular to the plates 16 and 18. The front side is comprised of a first and second section. The first section extends between the first sides 16C and 18C of the plates 16 and 18 and the notch 18E in the bottom plate 18. The second section extends between the second sides 16D and 18D of the plates 16 and 18 and the notch 18E. The front side of the housing 12 of the coupling device 10 prevents damage to the jaws 24 and 26 and reduces the possibility of injury to the user.

The first and second jaws 24 and 26 are pivotally mounted on pivot pins 28 between the top plate 16 and bottom plate 18. In the preferred embodiment, the pivot pins 28 extend essentially perpendicular to the plates 16 and 18. The plates 16 and 18 are preferably spaced apart a distance such that the jaws 24 and 26 are able to pivot easily between the plates 16 and 18. The jaws 24 and 26 are preferably identical and are mounted such as to be mirror images of each other. The jaws 24 and 26 have a first or front end 24A and 26A and a second or back end 24B and 26B with an outer side 24C and 26C and an inner side 24D and 26D extending therebetween. The inner sides 24D and 26D of the jaws 24 and 26 have a curved, concave shape to accept the spherical hitch ball 102. The jaws 24 and 26 have a stop protrusion 24E and 26E at the corner where the back end 24B and 26B and the outer side 24C and 26C intersect. The front end 24A and 26A of the jaws 24 and 26 is preferably narrower than the back end 24B and 26B of the jaws 24 and 26. In the open position, the front ends 24A and 26A of the jaws 24 and 26 are spaced apart and preferably do not extend into the notch 18E in the bottom plate 18. Each jaw 24 or 26 is provided with a spring 30 mounted around the pivot pin 28. The springs 30 are preferably torsion springs which act to bias the jaws 24 and 26 into the open position. In the open position, the jaws 24 and 26 are spaced apart at least the diameter of the top ball portion of the hitch ball 102. In the closed position, the front ends 24A and 26A of the jaws 24 and 26 meet essentially in the center of the notches 16E and 18E in the top and bottom plates 16 and 18. In the preferred embodiment, the front ends 24A and 26A of the jaws 24 and 26 are in contact with each other when the jaws 24 and 26 are in the closed position. In the closed position, the curved, inner sides 24D and 26D of the jaws 24 and 26 form a center opening which represents approximately 80% of a circle.

The side section 34 of the housing 12 preferably has a rectangular shape with an open first end 34A and a second end 34B and a front side 34C, a back side 34D, a top side 34E and a bottom side 34F forming an inner chamber 34G having a square cross-section. The inner chamber 34G has raised lugs 34H which have a rounded upper surface and which guide the slide bar 38. The lugs 34H reduce the amount of friction between the locking slide bar 38 and the side section 34 as the locking slide bar 38 moves. The lugs 34H also keep the locking slide bar 38 aligned in the inner chamber 34G. The second end 34B of the side section 34 is preferably closed with a center opening. The side section 34 is mounted at the first end 34A to the second sides 14D, 16D and 18D of the plates 14, 16 and 18 adjacent the front ends 14A, 16A and 18A of the plates 14, 16 and 18 such that the top and bottom sides 34E and 34F are essentially parallel to the plates 14, 16 and 18. In the preferred embodiment, the top side 34E is in the same plane as the top plate 16 and the bottom side 34F is in the same plane as the bottom plate 18. The bottom side 34F of the side section 34 and the bottom plate 18 are preferably formed as an integral piece. The top side 34E and the top plate 16 can also be formed as an integral piece. The side section 34 extends outward from the first end 34A toward the second end 34B away from the housing 12 of the coupling device 10. In the preferred embodiment, the front side 34C of the side section 34 of the locking mechanism 32 extends beyond the first end 34A of the side section 34 along the front ends 14A, 16A and 18A of the plates 14, 16 and 18 to the notch 18E in the bottom plate 18. Thus, the front side 34C of the side section 34 for the locking mechanism 32 also forms the second section of the front side of the housing 12 of the coupling device 10.

Figure 1:
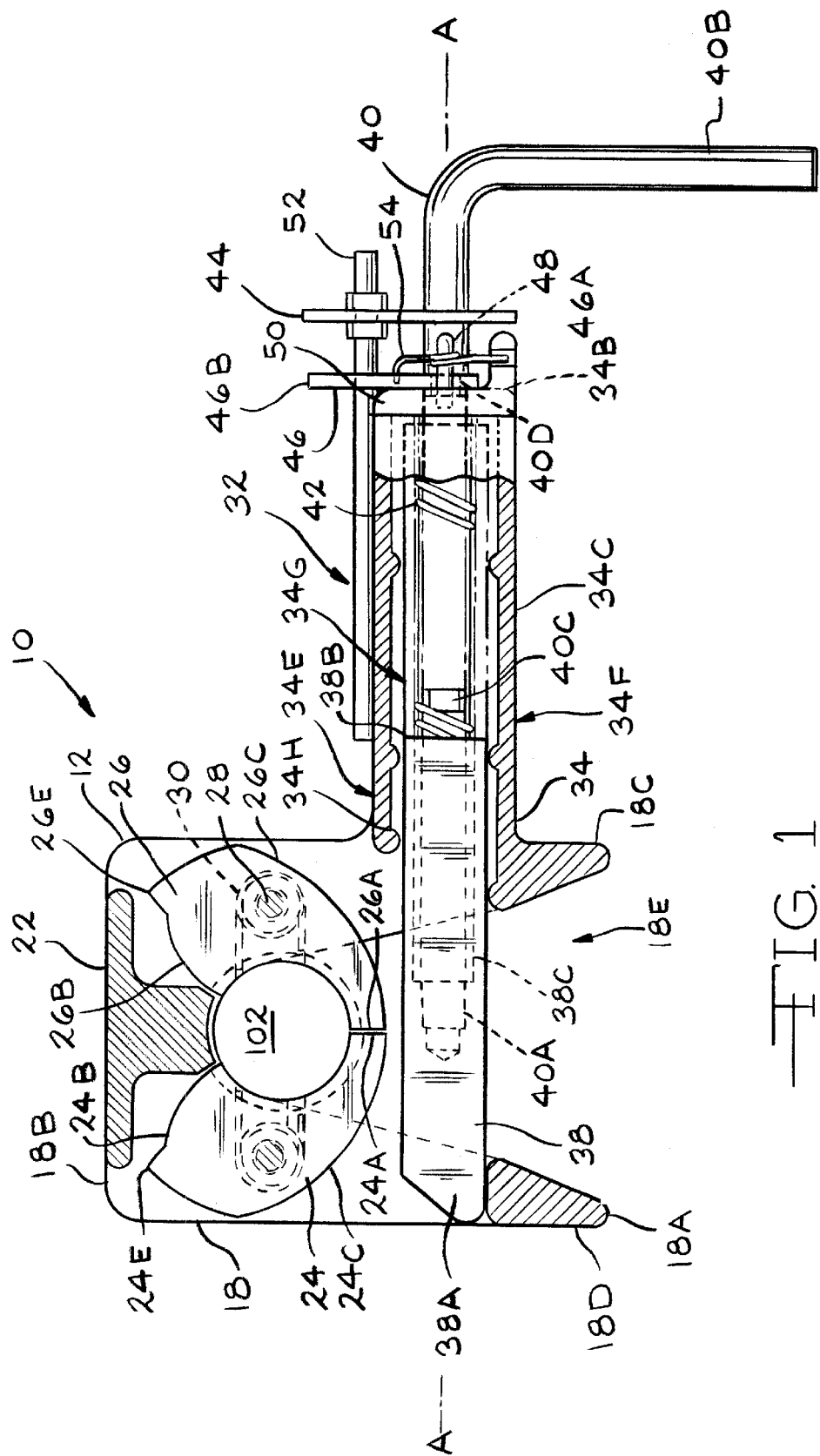
FIG. 1 is a top cross-sectional view showing the hitch ball 102 between the closed jaws 24 and 26 and the locking slide bar 38 in the locked, closed position.
Figure 4:
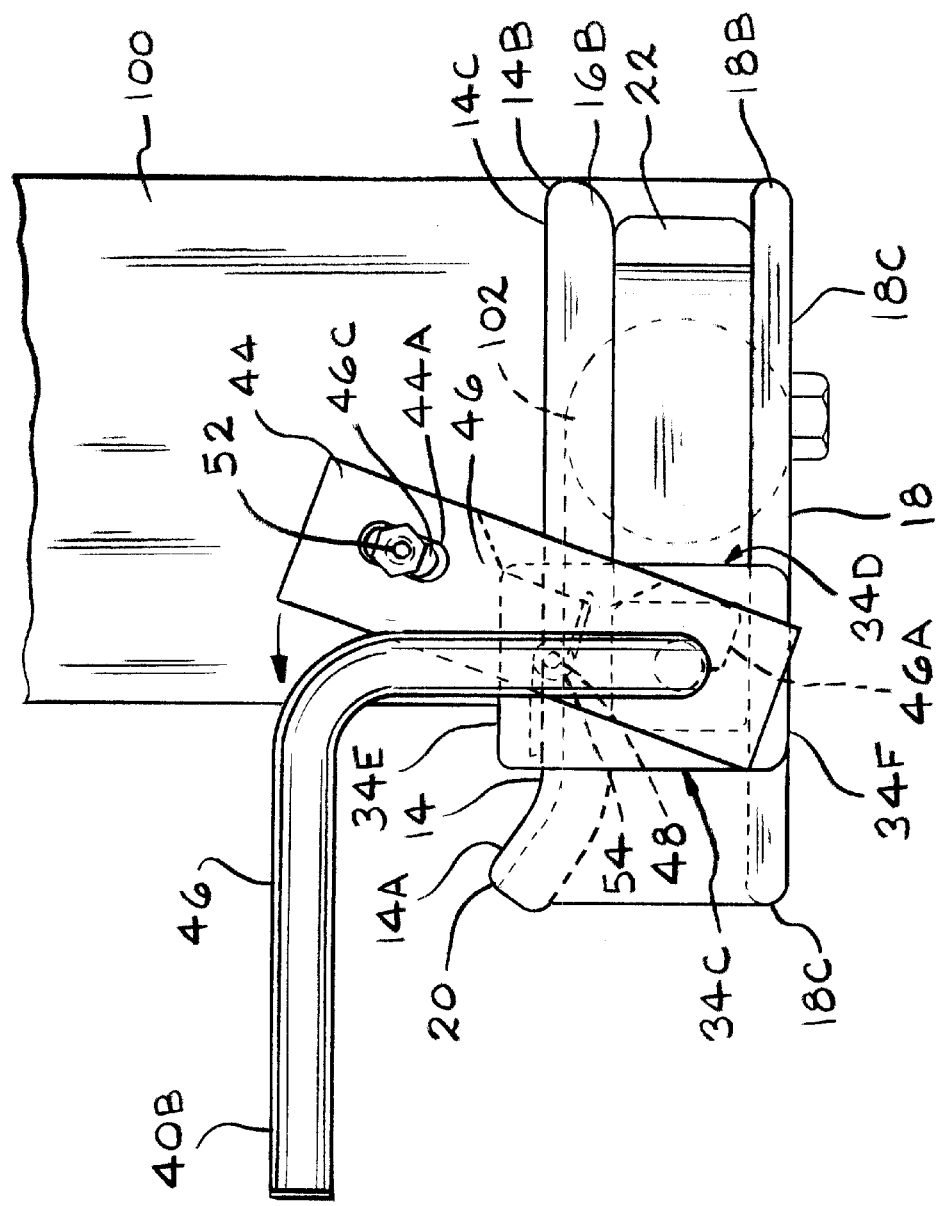
FIG. 4 is an end view showing the locking lever 46 and the guide plate 20.

The locking slide bar 38 is slidably mounted in the inner chamber 34G of the side section 34 of the housing 12. The locking slide bar 38 preferably has a rectangular shape with a square cross-section and opposed first and second ends 38A and 38B. However, the cross-sectional shape of the locking slide bar 38 is preferably similar to the cross-sectional shape of the inner chamber 34G of the side section 34. The locking slide bar 38 is of a size as to easily slide within the inner chamber 34G of the side section 34. The first end 38A of the locking slide bar 38 is preferably angled such that the front edge is longer than the back edge. The locking slide bar 38 has an inner bore 38C which extends partially into the locking slide bar 38 and has an opening at the second end 38B of the locking slide bar 38. The first end 40A of the handle 40 is preferably rotatably mounted in the inner bore 38C of the locking slide bar 38 at the second end 38B. The handle 40 extends outward from the locking slide bar 38 through the opening in the second end 34B of the side section 34 to the second end 40B of the handle 40. The handle 40 preferably has a cylindrical shape. The second end 40B of the handle 40 is preferably L-shaped to allow for grasping the handle 40 to move the locking slide bar 38. A spring 42 is mounted around the handle 40 inside the side section 34 and inside the center bore 38C of the locking slide bar 38. The spring 42 is preferably a compression spring. In the preferred embodiment, the spring 42 extends between the closed, second end of the side section 34 and the closed end of the center bore 38C of the locking slide bar 38. The handle 40 has a first concentric groove 40C adjacent the locking slide bar 38 and a second concentric groove 40D adjacent the L-shaped second end 40B of the handle 40. A trip lever 44 is mounted on the handle 40 between the second concentric groove 40D and the second end 40B of the handle 40. The trip lever 44 extends outward from the handle 40 and has a connector slot 44A to allow for connection of the trip lever rod 52 (FIGS. 1 and 4).

Figure 2:
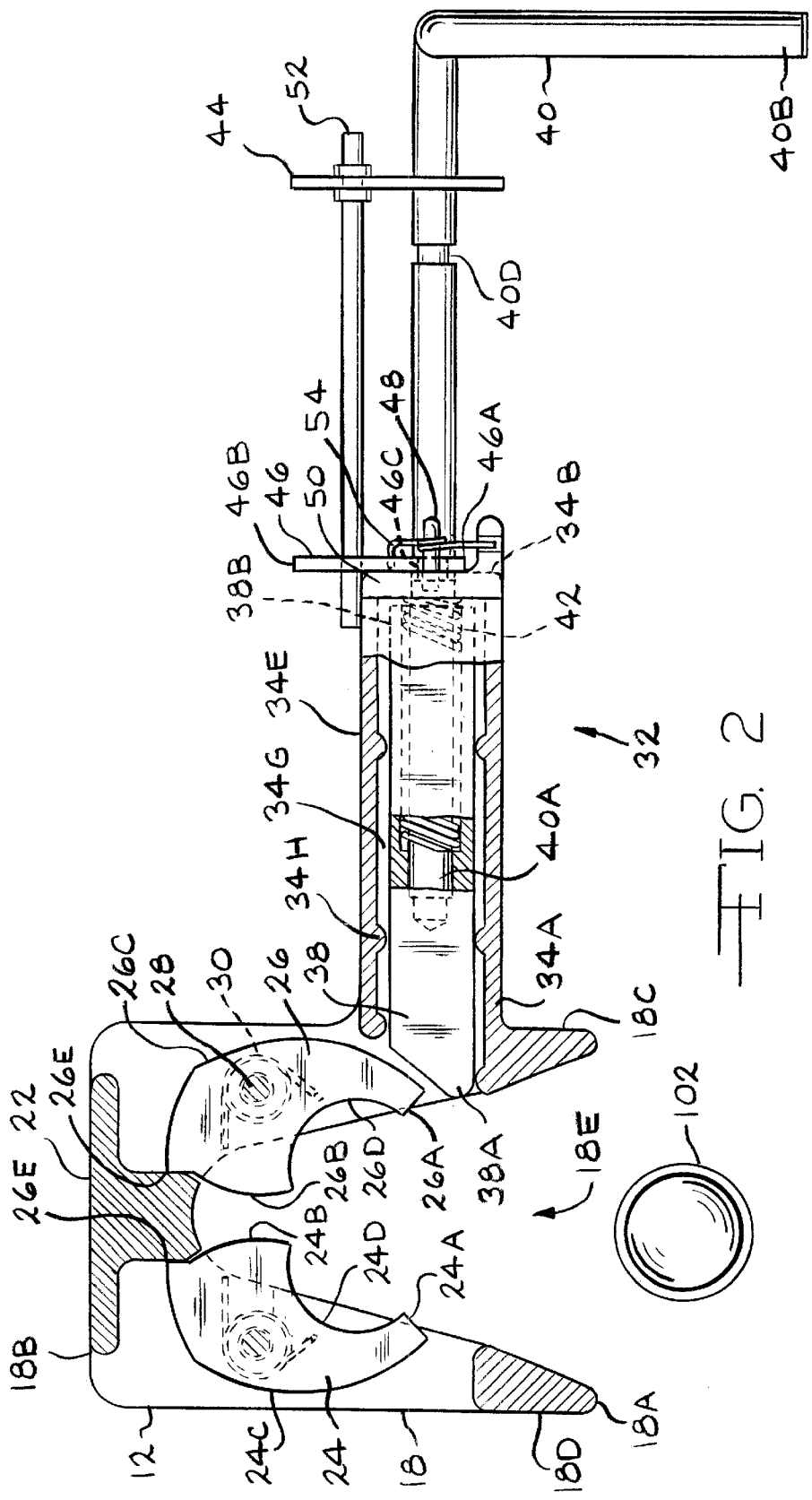
FIG. 2 is a top cross-sectional view with the jaws 24 and 26 in the open position and the locking slide bar 38 in the open, locked position.

A locking lever 46 is mounted on the second end 34B of the side section 34 of the housing 12. In the preferred embodiment, the locking lever 46 is pivotally mounted to the side section 34 by a pivot pin 48 (FIGS. 3 and 4) which extends through a vertical extension 50 integral to the side section 34 of the housing 12 (FIGS. 2 and 3). The vertical extension 50 extends upward from the top side 34E of the side section 34 at the second end 34B of the side section 34. The locking lever 46 has a first end 46A, a second end 46B and a central pivot hole 46D which allows the lever 46 to be pivotally mounted by the pivot pin 48 to the vertical extension 50. The first end 46A of the locking lever 46 has a hook-like shape with an inner side having a concave shape (FIG. 4). The second end 46B of the locking lever 46 has a connector slot 46C. In the preferred embodiment, a trip lever rod 52 is inserted through the connector slot 46C of the locking lever 46 and connected to the slot 44A of the trip lever 44. The trip lever rod 52 is preferably fixably mounted in each connector slot 44A and 46C. The locking lever 46 is mounted such that the first end 46A is adjacent the handle 40 which attaches to the locking slide bar 38. A torsion spring 54 is mounted on the pivot pin 48 for the locking lever 46 and tends to bias the locking lever 46 toward the handle 40 and into the locked position.

IN USE

Figure 5:
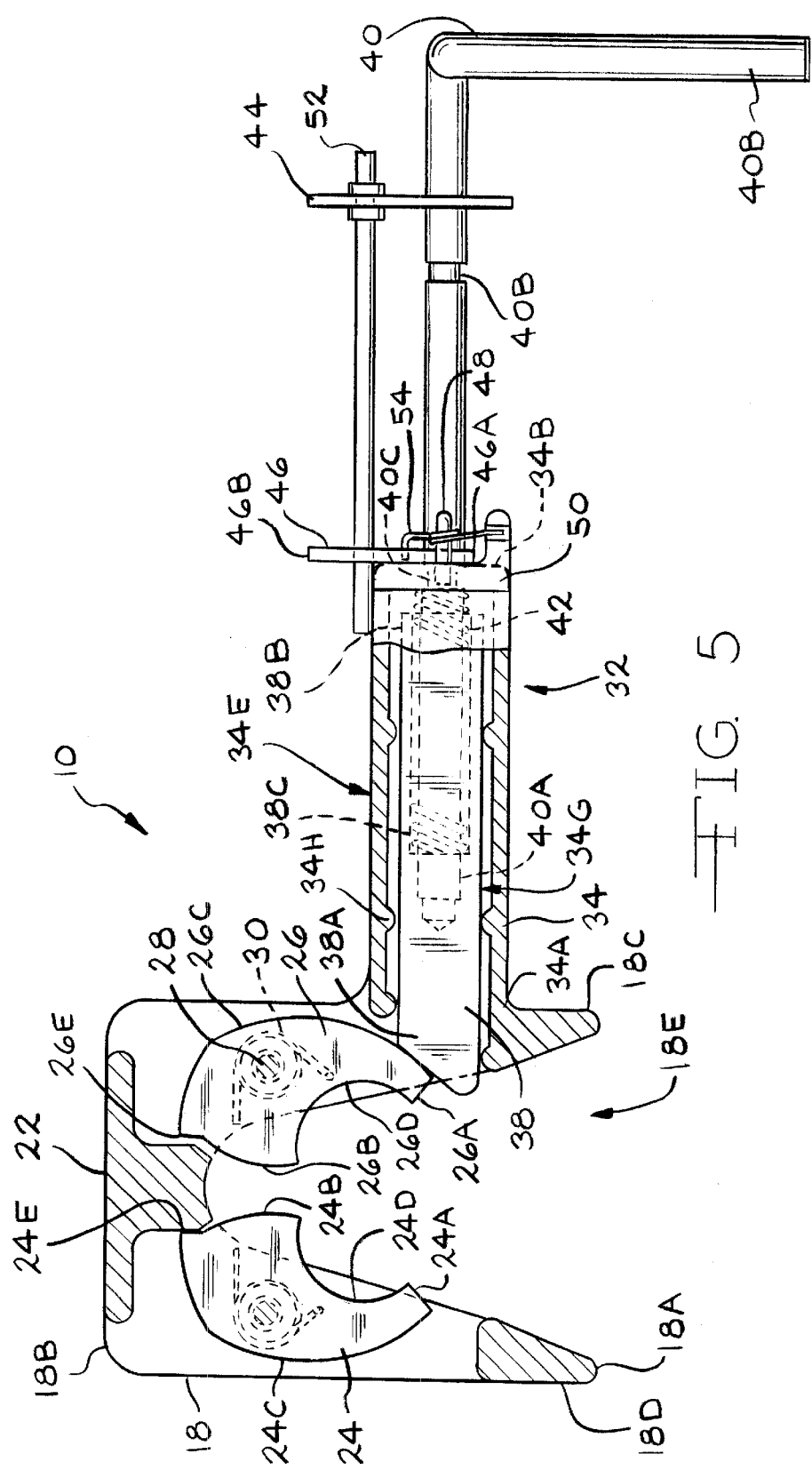
FIG. 5 is a top cross-sectional view with the jaws 24 and 26 in the open position and the locking slide bar 38 in the open, unlocked position.

The coupling device 10 is preferably mounted on the tubular end 100 or 200 of a gooseneck assembly for a trailer 104 to be towed. The gooseneck assembly can be a tube mounted to the trailer 104. The coupling device 10 is intended to be coupled to a hitch ball 102 installed in the bed 106A of a pickup truck as the towing vehicle 106. Prior to use, the coupling device 10 is preferably in the storage position with the jaws 24 and 26 in the fully open position and the locking mechanism 32 in the open, locked position (FIG. 2). In the open, locked position, the locking slide bar 38 of the locking mechanism 32 does not extend into or across the open first end of the notch 18E in the bottom plate 18 and the first end 46A of the locking lever 46 is in the first concentric groove 40C of the handle 40 of the locking slide bar 38. In the preferred embodiment, when the locking slide bar 38 is in the open, locked position, the second end 38B of the locking slide bar 38 is adjacent the second end 34B of the side section 34 for the locking mechanism 32 and the spring 42 is essentially completely within the inner bore 38C of the locking slide bar 38. To use the coupling device 10, the locking mechanism 32 is first unlocked. To unlock the locking mechanism 32, the handle 40 of the locking slide bar 38 is rotated axially along a longitudinal axis A—A of the locking slide bar 38 by rotating the second, handle end 40B (FIG. 1). As the handle 40 is rotated, preferably counterclockwise, the locking lever 46 is pivoted from the locked position to the unlocked position due to the connection of the trip lever rod 52 between the trip lever 44 on the handle 40 and the second end 46B of the locking lever 46. As the locking lever 46 is moved from the locked to the unlocked position, the locking lever 46 moves out of the first concentric groove 40C in the handle 40. When the locking lever 46 moves out of the first concentric groove 40C, the locking slide bar 38 moves inward toward the first side 14C, 16C and 18C of the plates 14, 16 and 18 until the first end 38A of the locking slide bar 38 contacts the outer side 26C of the second jaw 26 adjacent the first end 26A. The force of the spring 30 tending to keep the second jaw 26 open is greater than the force of the spring 42 of the locking slide bar 38 tending to move the locking slide bar 38 into the closed position. Thus, the second jaw 26 keeps the locking slide bar 38 in the open, unlocked position (FIG. 5). The stop protrusion 24E and 26E on the jaws 24 and 26 prevents the jaws 24 and 26 from rotating beyond a specific point in the open direction such that the first ends 24A and 26A of the jaws 24 and 26 remain in the path of the locking slide bar 38 when the jaws 24 and 26 are in the open position. The force of the locking slide bar 38 pushing on the outer side 26C of the second jaw 26B may cause the jaw 26 to move slightly toward the closed position. However, the force of the spring 30 is such that the jaw 26 will not move to a position where the front end 26A of the second jaw 26 interferes with the insertion of the hitch ball 102 between the jaws 24 and 26.

The hitch ball 102 is then moved into the housing 12 between the jaws 24 and 26. In the preferred embodiment, the gooseneck assembly with the coupling device 10 is moved horizontally toward the hitch ball 102. As the coupling device 10 moves toward the hitch ball 102, the hitch ball 102 moves into the notches 16E and 18E in the top and bottom plates 16 and 18 and into the opening between the front ends 24A and 26A of the jaws 24 and 26. If the hitch ball 102 is not aligned with the notches 16E and 18E, the hitch ball 102 may contact the guide plate 20 and be guided toward the notches 16E and 18E. In the preferred embodiment, the guide plate 20 allows for a successful hookup even if the hitch ball 102 is initially off-center in either direction. As the hitch ball 102 enters the notch 18E, the angled sides of the notch 18E move the hitch ball 102 toward the center of the notches 16E and 18E. As the hitch ball 102 moves between the open jaws 24 and 26, the hitch ball 102 contacts the inner side 24D and 26D of the jaws 24 and 26 adjacent the back end 24B and 26B. As the hitch ball 102 continues to move toward the back ends 16B and 18B of the plates 16 and 18 and the hitch ball stop 22, the hitch ball 102 moves further between the jaws 24 and 26 which pivots the jaws 24 and 26 toward the closed position. When the hitch ball 102 is completely between the jaws 24 and 26 and the jaws 24 and 26 are in the closed position, the hitch ball 102 is preferably in contact with the curved, front surface of the hitch ball stop 22 and the inner sides 24D and 26D of the jaws 24 and 26 encircle a portion of the hitch ball 102 approximately slightly less than 360°. In the preferred embodiment, the jaws 24 and 26 encircle the top, ball portion of the hitch ball 102 above the concentric indention (FIG. 3). As the jaws 24 and 26 move into the closed position, the front ends 24A and 26A of the jaws 24 and 26 move out of the path of the locking slide bar 38. When the jaws 24 and 26 move out of the path and the first jaw 24 moves out of contact with the first end 38A of the locking slide bar 38, the force of the spring 42 of the locking slide bar 38 moves the locking slide bar 38 into the closed position without further assistance from the user (FIG. 1). In the closed position, the locking slide bar 38 extends completely across the open first ends of the notches 16E and 18E and across the front ends 24A and 26A of the jaws 24 and 26. Preferably, in the closed position, the front ends 24A and 26A of the jaws 24 and 26 do not contact the locking slide bar 38. In the preferred embodiment, the distance between the jaws 24 and 26 and the locking slide bar 38 is about 0.025 inches (0.064 cm). Once the locking slide bar 38 moves into the fully closed position, the spring 54 of the locking lever 46 moves the locking lever 46 into the second concentric groove 40D and locks the handle 40 and locking slide bar 38 to which it attaches in the closed position.

In the preferred embodiment, once the locking slide bar 38 is in the open, unlocked position, the handle 40 is rotated back to the locked position. Thus, when the locking slide bar 38 automatically moves to the closed position, the locking lever 46 automatically moves into the second concentric groove 40D and locks the locking mechanism 32. In the preferred embodiment when the coupling device 10 is in position on the hitch ball 102, the bottom surface of the bottom plate 18 is adjacent and in contact with the surface on which the hitch ball 102 is mounted. Preferably, a single user is able to connect the coupling device 10 to the hitch ball 102. To provide additional security, chains (not shown) can be provided which extend between the gooseneck assembly and the towing vehicle 106 to further prevent the coupling device 10 from becoming disconnected from the hitch ball 102.

Figure 6:
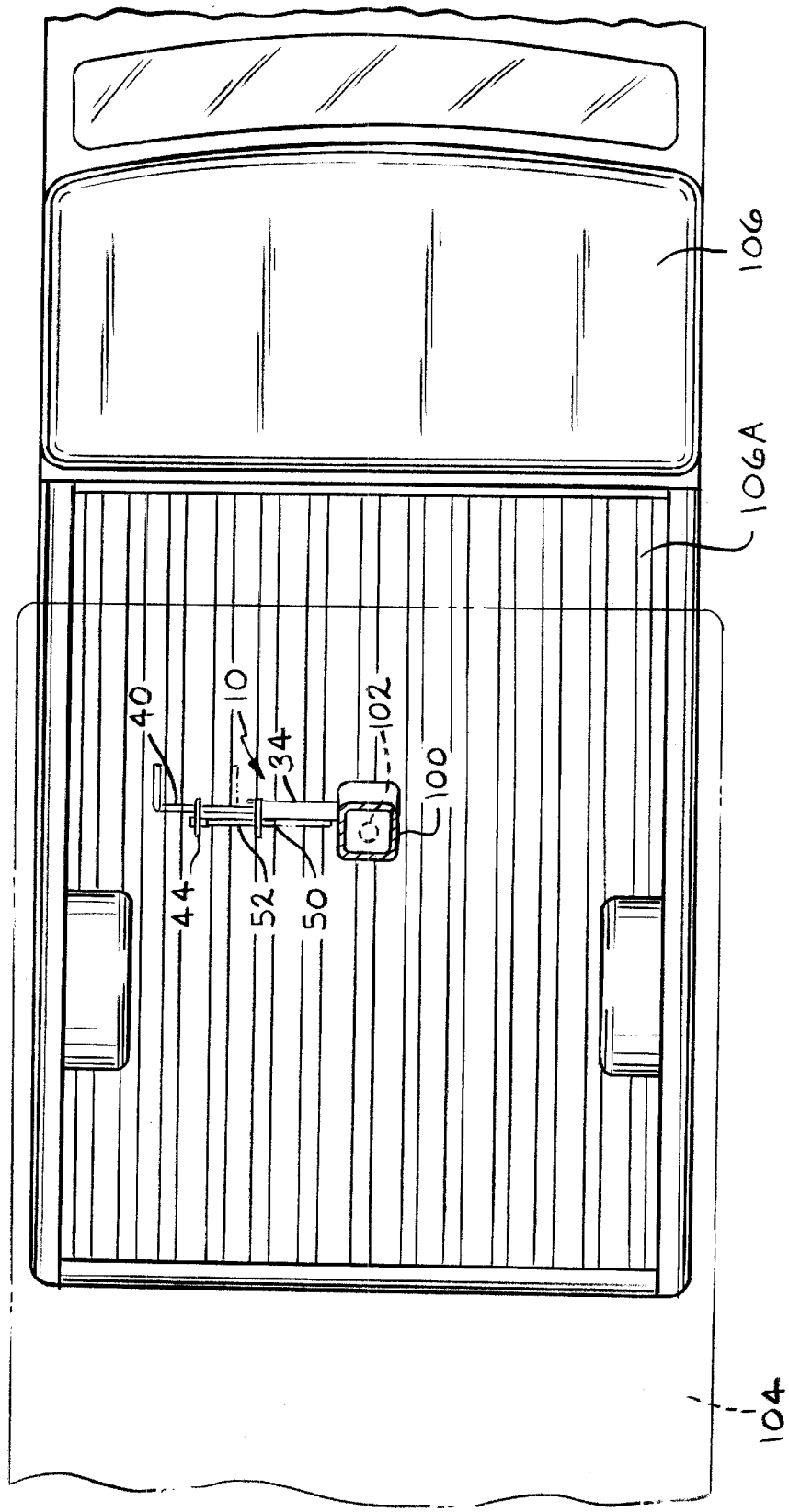
FIG. 6 is a top view of the towing truck 106 with the coupling device 10 coupled to the hitch ball 102 and with the towed trailer 104 shown in phantom.

To unhook the coupling device 10, the second end 40B of the handle 40 is grasped and rotated axially in a counter-clockwise direction. In the preferred embodiment, the handle 40 is of such a length that a user is able to grasp and rotate the handle 40 without entering the bed 106A of the truck 106 (FIG. 6). This allows for quick and easy uncoupling of the trailer 104 from the towing truck 106 by a single user. Rotating the handle 40 unlocks the locking mechanism 32 by moving the locking lever 46 out of the second concentric groove 40D. The user then pulls on the handle 40 exerting a force in a direction opposite the housing 12 of the coupling device 10. The user continues to pull until the first concentric groove 40C of the handle 40 is adjacent the locking lever 46. The user then rotates the second end 40B back to the original orientation which moves the locking lever 46 into the first concentric groove 40C and locks the locking mechanism 32 in the open position. Alternatively, the user can immediately rotate the second end 40B of the handle 40 once the second concentric groove 40D is no longer aligned with the locking lever 46. In this configuration, the locking lever 46 automatically moves into the first concentric groove 40C as soon as the first concentric groove 40C is aligned with the locking lever 46. The torsion spring 54 of the locking lever 46 biases the locking lever 46 into the concentric groove 40C or 40D and the locked position whenever the handle 40 is rotated into the automatic, locked position and a concentric groove 40C or 40D is aligned with the locking lever 46.

once the locking slide bar 38 is in the open position, the hitch ball 102 can be moved out of the space between the jaws 24 and 26. As the hitch ball 102 is removed, the force of the hitch ball 102 on the inner side 24D or 26D of the jaws 24 and 26 adjacent the front end 24A and 26A and the force of the springs 30 move the jaws 24 and 26 into the open position. The springs 30 act to keep the jaws 24 and 26 in the open position, once the hitch ball 102 has been removed.

It is intended that the foregoing description be only illustrative of the present invention and that the present invention be limited only by the hereinafter appended claims.

I claim:

1. A coupling device for mounting on a gooseneck of a towed trailer for coupling the towed trailer to a hitch ball mounted on a towing vehicle, which comprises:

(a) a plate having a first end and a second end with a first surface and a second surface extending therebetween with the second surface mounted on the gooseneck;

(b) a pair of jaws each having a first end and a second end and pivotally mounted between the ends adjacent the first surface of the plate such that the first end of the jaws is adjacent the first end of the plate and a space is provided between the jaws wherein in an open position, the first ends of the jaws are spaced apart and wherein when the hitch ball is moved between the spaced apart, first ends of the jaws into the space between the jaws, the hitch ball contacts the jaws at the second end of the jaws and pivots the jaws into a closed position such that the first ends of the jaws move towards each other;

(c) a stop mounted adjacent the second end of the jaws such that when the jaws are in the closed position and the second ends of the jaws are spaced apart, the stop extends between the spaced apart second ends of the jaws; and (d) a locking slide bar mounted adjacent the first ends of the jaws such that in a closed position with the jaws in the closed position, the locking slide bar extends adjacent the first ends of the jaws and prevents the jaws from pivoting into the open position.

2. The coupling device of claim 1 wherein the plate includes a guide at the first end extending outward from the first end away from the second end of the plate wherein the guide acts to guide the hitch ball between the first ends of the jaws.

3. The coupling device of claim 1 wherein the locking slide bar has a biasing means which tends to bias the locking slide bar into the closed position.

4. The coupling device of claim 3 wherein the biasing means is a compression spring.

5. The coupling device of claim 1 wherein when the locking slide bar is in an unlocked, open position at least one of the pair of jaws is in a path of the locking slide bar and prevents the locking slide bar from moving to the closed position wherein as the jaws are pivoted to the closed position, at least one of the pair of jaws moves out of the path of the locking slide bar and allows the locking slide bar to move into the closed position.

6. The coupling device of claim 1 wherein each of the pair of jaws has a torsion spring which biases the jaw into the open position.

7. The coupling device of claim 1 wherein the locking slide bar has a first biasing means tending to move the locking slide bar into the closed position, wherein each of the pair of jaws has a second biasing means tending to move the jaws into the open position and wherein when the jaws are in the open position, a force of the second biasing means of the jaws acts against a force of the first biasing means of the locking slide bar to prevent the locking slide bar from moving into the closed position.

8. The coupling device of claim 1 wherein each of the jaws has an inner side between the ends having a curved shape and wherein as the hitch ball is moved into the space between the jaws, the hitch ball contacts the inner sides of the jaws at the second end and pivots the jaws to the closed position.

9. The coupling device of claim 1 wherein the pair of jaws are identical and are mounted such as to be mirror images of each other.

10. The coupling device of claim 1 wherein a locking means for locking the locking slide bar in a locked, closed position or a locked, open position is connected to the locking slide bar wherein a handle is attached to the locking slide bar and wherein the locking means is moved between a locked position and an unlocked position by axially rotating the handle attached to the locking slide bar.

11. The coupling device of claim 10 wherein the locking means is a lever having a first end and a second end and pivotally mounted between the ends adjacent the locking slide bar and having a biasing means which biases the lever into a locked position wherein the second end of the lever is connected to the handle such that when the handle is rotated, the first end of the lever is moved into and out of contact with the handle to lock and unlock the locking slide bar to which the handle is attached.

12. The coupling device of claim 11 wherein the handle and lever are connected together by a trip rod and wherein the handle is rotated to lock and unlock the locking slide bar.

13. The coupling device of claim 11 wherein the handle has a first groove and a second groove wherein when the locking slide bar is in the locked, open position, the first end of the lever is in the first groove and wherein when the locking slide bar is in the locked, closed position, the first end of the lever is in the second groove of the handle.

14. The coupling device of claim 10 wherein a handle is rotatably mounted on the locking slide bar and a spring is mounted around the handle and wherein the spring acts to move the locking slide bar into the closed position such that the locking slide bar is adjacent the jaws.

15. The coupling device of claim 1 wherein a handle is rotatably mounted on the locking slide bar and a spring is mounted around the handle adjacent the locking slide bar and wherein the spring acts to move the locking slide bar into the closed position such that the locking slide bar is adjacent the first end of the jaws.

16. A coupling device for mounting on a towed gooseneck trailer for coupling the towed trailer to a hitch ball of a towing vehicle which comprises:

(a) a housing having an open first end and configured to be mounted on the towed gooseneck trailer;

(b) a pair of jaws pivotally mounted on the housing such that when the hitch ball is moved into the open first end of the housing, the hitch ball contacts the jaws and pivots the jaws between an open position and a closed position wherein when in the open position, the jaws do not block the open first end of the housing and wherein in the closed position, the jaws block the open first end of the housing;

(c) a locking slide bar slidably mounted on the housing adjacent the open first end and configured to slide to a closed position across the open first end of the housing to block the open first end of the housing, wherein when the locking slide bar is in the closed position, the jaws are in the closed position and wherein in the closed position, the locking slide bar and the pair of jaws prevent the hitch ball from moving out of the open first end of the housing; and (d) a handle rotatably mounted on the locking slide bar with a locking means for locking the locking slide bar in a locked, closed position or a locked, open position connected to the handle wherein the locking means is moved between a locked position and an unlocked position by axially rotating the handle.

17. The coupling device of claim 16 wherein a guide is mounted on the housing adjacent the open first end and wherein the guide acts to guide the hitch ball in a direction toward the open first end of the housing.

18. The coupling device of claim 16 wherein the locking slide bar has a biasing means which tends to bias the locking slide bar into the closed position.

19. The coupling device of claim 18 wherein when the locking slide bar is in an unlocked, open position, at least one of the pair of jaws is in a path of the locking slide bar and prevents the locking slide bar from moving to the closed position wherein as the jaws are pivoted to the closed position, at least one of the pair of jaws moves out of the path of the locking slide bar and allows the locking slide bar to move into the closed position.

20. The coupling device of claim 18 wherein the biasing means is a compression spring.

21. The coupling device of claim 16 wherein each of the pair of jaws has a spring which biases the jaws into the open position.

22. The coupling device of claim 16 wherein the locking slide bar has a first biasing means tending to move the locking slide bar into the closed position, wherein each of the pair of jaws has a second biasing means tending to move the jaws into the open position and wherein when the jaws are in the open position and the locking slide bar is in an unlocked, open position, a force of the second biasing means of one of the jaws acts against a force of the first biasing means of the locking slide bar and acts to prevent the locking slide bar from moving into the closed position.

23. The coupling device of claim 16 wherein each of the jaws has a first end and a second end with a curved inner side spaced between the ends and wherein when the jaws are in the open position and the hitch ball is moved between the jaws, the hitch ball contacts the inner side of the jaws at the second end and pivots the jaws to the closed position.

24. The coupling device of claim 16 wherein the pair of jaws are identical and are mounted such as to be mirror images of each other.

25. The coupling device of claim 16 wherein the locking means is a lever having a first end and a second end and pivotally mounted between the ends adjacent the locking slide bar and having a biasing means which biases the lever into the locked position wherein the second end of the lever is connected to the handle such that when the handle is rotated, the first end of the lever is moved into and out of contact with the handle to lock and unlock the locking slide bar.

26. The coupling device of claim 25 wherein the handle and lever are connected together by a trip rod and wherein the handle is rotated in a counterclockwise direction to lock and unlock the locking slide bar.

27. The coupling device of claim 25 wherein the handle has a first groove and a second groove wherein when the locking slide bar is in the locked, open position, the first end of the lever is in the first groove of the handle and wherein when the locking slide bar is in the locked, closed position, the first end of the lever is in the second groove of the handle.

28. The coupling device of claim 16 wherein a spring is mounted around the handle and wherein the spring acts to move the locking slide bar into the closed position such that the locking slide bar is adjacent the jaws.

29. The coupling device of claim 16 wherein the towing vehicle is a truck and wherein the hitch ball is mounted in a bed of the truck and wherein the handle is of a length such that the handle can be rotated without entering the bed of the truck.

30. A gooseneck attachment for use on a towed trailer for providing a connection with a hitch ball mounted in a bed of a towing vehicle which comprises:
(a) a tube having first and second ends with the first end connected to the towed trailer;
(b) a coupling device mounted at the second lend of the tube for connecting to the hitch ball, the coupling device having:

(i) a housing mounted on the second end of the tube and having an opening into which the hitch ball is moved;
(ii) a pair of jaws pivotally mounted inside the housing so as to open to the opening and close at the opening, wherein when the jaws are in an open position and the hitch ball is moved horizontally into the housing through the opening, the hitch ball engages the jaws and pivots the jaws into a closed position and wherein the jaws are opened by moving the hitch ball toward the opening which releases the hitch ball; and
(iii) a locking slide bar mounted on the housing so as to slide across the opening in the housing and block the pivoting of the jaws so that when the towing vehicle and towed trailer are connected with the hitch ball between the jaws and the jaws in the closed position, the hitch ball does not move out of the opening in the housing.

31. The attachment of claim 30 wherein a biasing means mounted on the locking slide bar biases the locking slide bar across the opening in the housing.

32. The attachment of claim 30 wherein the housing has a top plate adjacent the second end of the tube, wherein the top plate has locating lugs on a side adjacent the tube and wherein the locating lugs assist in locating the housing of the coupling device on the tube such that the tube is symmetrical around a vertical axis through a center of the hitch ball when the hitch ball is fully engaged by the coupling device.

33. The attachment of claim 32 wherein the tube has a square cross-section with an interior chamber and wherein the locating lugs extend into the interior chamber to locate the coupling device on the tube.

34. The attachment of claim 32 wherein the tube has a round cross-section with a sidewall extending between the ends having an outer surface and wherein the locating lugs extend adjacent to the outer surface of the tube to locate the coupling device on the tube.

35. The attachment of claim 30 wherein the jaws have a first end and a second end with a curved inner side spaced therebetween and wherein when the jaws are in the open position, the first end of the jaws are spaced apart at least a distance equal to a diameter of the hitch ball.

36. The attachment of claim 35 wherein the first ends of the jaws are in a closely spaced relationship to each other when in the closed position and extend around the hitch ball adjacent the opening in the housing.

37. The attachment of claim 30 wherein a handle is movably mounted on the locking slide bar and extends from the housing which allows the locking slide bar to be moved manually with the handle from across the opening in the housing so that the jaws are able to open to release the hitch ball from the coupling.

38. The attachment of claim 30 wherein a guide is mounted on the second end of the tube adjacent the opening of the housing and is inclined so that the hitch ball is guided into the opening in. the housing as the hitch ball is moved horizontally towards the coupling device.

39. The coupling device of claim 37 wherein the towing vehicle is a truck and wherein the hitch ball is mounted in a bed of the truck and wherein the handle is of a length such that the handle can be moved without entering the bed of the truck.

40. A method for coupling a gooseneck trailer to be towed to a hitch ball in a bed of a towing vehicle, which comprises the steps of:
(a) providing a coupling device mounted on a tube extending from the gooseneck trailer, the coupling device including a housing having an open, first end and configured to be mounted on the tube of the gooseneck trailer; a pair of jaws pivotally mounted on the housing such that when the hitch ball is moved into the open, first end of the housing, the hitch ball contacts the jaws and pivots the jaws between an open position and a closed position, wherein when in the open position, the jaws do not block the open first end of the housing and when in the closed position, the jaws extend around the hitch ball adjacent the open first end and block the open first end of the housing; and a locking slide bar slidably mounted on the housing adjacent the open, first end and configured to slide to a closed position across the open first end of the housing to block the open first end of the housing; and (b) moving the hitch ball essentially horizontally into the open, first end of the housing of the coupling device with the jaws in the open position wherein as the hitch ball contacts the jaws, the jaws pivot to the closed position and the locking slide bar moves to the closed position such that the locking slide bar prevents the hitch ball from moving out of the housing when the towed gooseneck trailer is being towed.

41. The method of claim 40 wherein to release the hitch ball, the locking slide bar is moved to a locked, open position such that the locking slide bar does not extend across the open, first end of the housing and the hitch ball is moved essentially horizontally toward the open, first end of the housing and contacts the jaws which moves the jaws into the open position.

42. The method of claim 40 wherein a guide is provided on the end of the tube adjacent the open, first end of the housing and wherein as the hitch ball moves toward the open, first end of the housing, the hitch ball contacts the guide which acts to guide the hitch ball into the open, first end of the housing.

43. The method of claim 40 wherein a locking means is connected to the locking slide bar and wherein the locking means automatically moves to lock the locking slide bar when the locking slide bar is moved to the closed position or to an open position.

44. The method of claim 40 wherein before step (b), the locking slide bar is moved from a locked, open position to an unlocked, open position wherein to unlock the locking slide bar, the locking slide bar is rotated about a longitudinal axis of the locking slide bar which moves the locking means into an unlocked position wherein when the locking means moves into the unlocked position, the locking slide bar moves to the unlocked, open position and wherein in the unlocked, open position, at least one of the pair of jaws is in a path of the locking slide bar and prevents the locking slide bar from moving to the closed position wherein as the jaws are pivoted to the closed position, at least one of the pair of jaws moves out of the path of the locking slide bar and allows the locking slide bar to move into the closed position.

45. The method of claim 44 wherein a handle is rotatably mounted on the locking slide bar and wherein to unlock the locking slide bar, the handle is rotated about the longitudinal axis of the locking slide bar.

46. The method of claim 45 wherein the handle is of a length such that the handle can be rotated to unlock the locking slide bar without entering the bed of the towing vehicle.

47. A coupling device for mounting on a towed gooseneck trailer for coupling the towed trailer to a hitch ball of a towing vehicle which comprises:

(a) a housing having an open first end and configured to be mounted on the towed gooseneck trailer;

(b) a pair of jaws pivotally mounted on the housing such that when the hitch ball is moved into the open first end of the housing, the hitch ball contacts the jaws and pivots the jaws between an open position and a closed position wherein when in the open position, the jaws do not block the open first end of the housing and wherein in the closed position, the jaws block the open first end of the housing;

(c) a locking slide bar slidably mounted on the housing adjacent the open first end and configured to slide to a closed position across the open first end of the housing to block the open first end of the housing, wherein when the locking slide bar is in the closed position, the jaws are in the closed position and wherein in the closed position, the locking slide bar and the pair of jaws prevent the hitch ball from moving out of the open first end of the housing; and (d) a handle rotatably mounted on the locking slide bar.

48. The coupling device of claim 47 wherein a spring is mounted around the handle and wherein the spring acts to move the locking slide bar into the closed position such that the locking slide bar is adjacent the jaws.

* * * * *

UNITED STATES PATENT AND TRADEMARK OFFICE
CERTIFICATE OF CORRECTION

PATENT NO. : 6,467,793 B2
DATED : October 22, 2002
INVENTOR(S) : Rex D. Putnam

It is certified that error appears in the above-identified patent and that said Letters Patent is hereby corrected as shown below:

Column 1,
Line 35, "to Tracev; U.S. Pat. No." should be -- to Tracey; U.S. Pat. No. --.
Line 43, "PaTlinski show hitch" should be -- Paplinski show hitch --.
Line 58, "similar to those. of the" should be -- similar to those of the --.
Line 63, "713 to Blodaett, Jr." should be -- 713 to Blodgett, Jr. --.

Column 10,
Line 52, "once the locking slide" should be -- Once the locking slide --.

Column 14,
Line 56, "into the opening in. the housing" should be -- into the opening in the housing --.

Signed and Sealed this

Twenty-fifth Day of March, 2003

JAMES E. ROGAN
*Director of the United States Patent and Trademark Office*